United States Patent
Manmohan et al.

(10) Patent No.: US 9,058,485 B1
(45) Date of Patent: Jun. 16, 2015

(54) DATA LOSS PREVENTION (DLP) THROUGH REMOVEABLE MEDIA

(75) Inventors: Sarin Sumit Manmohan, Pune (IN); Amit Shinde, Pune (IN)

(73) Assignee: Symantec Corporation, Mountain View, CA (US)

( * ) Notice: Subject to any disclaimer, the term of this patent is extended or adjusted under 35 U.S.C. 154(b) by 298 days.

(21) Appl. No.: 13/242,163

(22) Filed: Sep. 23, 2011

(51) Int. Cl.
 *G06F 21/00* (2013.01)
 *G06F 21/55* (2013.01)
 *G06F 17/30* (2006.01)

(52) U.S. Cl.
 CPC ........ *G06F 21/552* (2013.01); *G06F 17/30165* (2013.01)

(58) Field of Classification Search
 CPC ..................................... G06F 21/552
 USPC .......................................... 707/694
 See application file for complete search history.

(56) References Cited

U.S. PATENT DOCUMENTS

| | | | |
|---|---|---|---|
| 8,224,796 B1 * | 7/2012 | Shinde et al. ................. | 707/695 |
| 2002/0133711 A1 * | 9/2002 | Peretti ........................... | 713/193 |
| 2007/0180530 A1 * | 8/2007 | Verma et al. .................... | 726/24 |
| 2010/0162347 A1 * | 6/2010 | Barile .............................. | 726/1 |
| 2011/0184877 A1 * | 7/2011 | McHugh et al. .............. | 705/318 |

* cited by examiner

*Primary Examiner* — James Trujillo
*Assistant Examiner* — Grace Park
(74) *Attorney, Agent, or Firm* — Lowenstein Sandler LLP

(57) ABSTRACT

Method and apparatuses for detecting violations of data loss prevention (DLP) in NTFS removable media and non-NTFS removable media are described. In NTFS, when an application opens a data file, a DLP file system filter driver internally opens the same data file using file system transaction and is transparent to the application. Application read/writes are redirected to the remote transaction. When the application tries to close the file, the DLP agent scans the data being written to the file for detection of violations and commits or aborts the remote transaction depending upon the detection of a violation of the policy.

18 Claims, 12 Drawing Sheets

DATA LOSS PREVENTION (DLP) THROUGH REMOVEABLE MEDIA

TECHNICAL FIELD

Embodiments of the invention relate to the field of processing data, and more particularly, to improving data loss prevention (DLP) through removable media.

BACKGROUND OF THE INVENTION

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

DLP technologies apply configurable rules to identify objects, such as files, that contain sensitive data and should not be found outside of a particular enterprise or specific set of host computers or storage devices. Even when these technologies are deployed, it is possible for sensitive objects to 'leak'. Occasionally, leakage is deliberate and malicious, but often it is accidental too. For example, in today's global marketplace environment, a user of a computing system transmits data, knowingly or unknowingly, to a growing number of entities outside a computer network of an organization or enterprise. Previously, the number of entities were very limited, and within a very safe environment. For example, each person in an enterprise would just have a single desktop computer, and a limited number of software applications installed on the computer with predictable behavior. For example, when a user opens an existing file on a removable media, a backup copy of the existing file is created. When user modifies the file contents and if it is found to contain confidential data (as defined by the DLP policy), the configured remediation action is taken. For instance if the remediation is to block the user operation, the backup copy of the existing file is restored to the target file location. The existing method for preventing data loss from removable media is inefficient, as it requires additional copy of the existing data, and error prone as the user can remove the removable media before the completion of the detection request which would result in loss of confidential data. The issues are compounded when the size of the file is significant.

SUMMARY OF THE INVENTION

A method of detecting violations of a data loss prevention (DLP) policy through NTFS removable media and non-NTFS removable media is described. In one exemplary embodiment of a method, a computing system, using a DLP filter driver, detects when an application opens and closes a file stored on a removable media mounted on a file system of the computing system. When the application opens the file, the DLP filter driver creates a transaction file object to allow detection of a violation of a DLP policy in data being written to the file stored on the removable media. When the application closes the file, the DLP filter driver initiates a scan of the file to detect a violation of the DLP policy in the data being written to the file. The DLP filter driver prevents a commit of a write transaction of the application to the file when a violation of the DLP policy is detected during the scan.

In one embodiment, the removable media is New Technology File System (NTFS) removable media and the DLP filter driver opens the file using a file object when the application opens the file and opens the same file using the transaction file object. The transaction file object may be an NTFS transaction file object and the transaction is a NTFS transaction. When the violation of the DLP policy is detected during the scan, the DLP filter driver prevents a commit of the NTFS transaction to write data to the file by aborting the NTFS transaction. When a violation of the DLP policy is not detected, the NTFS transaction file object allows a commit of the NTFS transaction to write data to the file by committing the NTFS transaction. This allows the write to the file in the removable medium to be persistent.

In another embodiment, the DLP filter driver detects application read and write applications originally directed to the file object. The DLP filter driver redirects the read and write operations to the transaction file object, and the DLP filter driver performs the read and write operations on the file as NTFS transactions using the NTFS transaction file object. In one embodiment, the NTFS transaction file object creates a NTFS transaction to modify the file. The NTFS transaction is committed if there is not violation and is aborted when the there is a violation of the DLP policy is detected during the scan.

In other embodiments, where the removable media does not support transactions, such as some types of non-NTFS removable media, the DLP filter driver opens the file using a file object when the application opens the file and creates a local copy of the file. The transaction file object opens the local copy of the file. The DLP filter driver detects read and write operations, and minors the read and write operations to the file object and to the transaction file object. The file object performs the operations on the file and the transaction file object performs the operations on the local copy as local transactions. For example, in one embodiment, the transaction file object creates a local transaction to modify the local copy of the file. The transaction file object commits the local transaction when the violation of the DLP policy is not detected during the scan. When the violation of the DLP policy is detected during the scan, the transaction file object aborts the local transaction and copies the local copy to overwrite the file stored on the removable media. Because the local transaction was aborted, the local copy represents the file before the modification. In one embodiment, the transaction file object may be a NTFS transaction file object and the transactions are NTFS even though the removable media is non-NTFS removable media. In another embodiment, the transaction file object is a remote NTFS transaction file object.

The removable media may be a removable storage medium, a network share, or a remote desktop protocol (RDP) volume. Alternatively, other types of removable media may be used as would be appreciated by one of ordinary skill in the art having the benefit of this disclosure.

In addition, a computer readable storage medium for detecting violations of a DLP policy through NTFS removable media and non-NTFS removable media is described. An exemplary computer readable storage medium provides instructions, which when executed on a processing system causes the processing system to perform a method such as the exemplary methods discussed above.

Further, a system for detecting violations of a DLP policy through NTFS removable media and non-NTFS removable media is described. An exemplary system may include a memory and a processor coupled to the memory. The processor is configured to detect, using a DLP filter driver executing on the computing system, when an application opens and closes a file stored on a removable media mounted on a file system of the computing system. The processor is also configured to create a transaction file object, when the application opens the file, to allow detection of a violation of a DLP policy in data being written to the file. The processor is also configured to initiate, by the transaction file object when the application closes the file, a scan of the file to detect a violation of a DLP policy in the data being written to the file. The processor is also configured to prevent a commit of a write transaction of the application to the file when a violation of the DLP policy is detected during the scan.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for detecting violations of data loss prevention (DLP) in NTFS removable media and non-NTFS removable media. In one exemplary embodiment of a method, a computing system, using a DLP filter driver, detects when an application opens and closes a file stored on a removable media mounted on a file system of the computing system. When the application opens the file, the DLP filter driver creates a transaction file object to allow detection of a violation of a DLP policy in data being written to the file stored on the removable media. When the application closes the file, the DLP filter driver initiates a scan of the file by a detection system of a DLP agent. The detection system scans the file to detect a violation of the DLP policy in the data being written to the file stored in the removable media. The DLP filter driver prevents the commit of the application's write transaction to the file when a violation of the DLP policy is detected during the scan.

Conventional solutions are inefficient as they require multiple copies of the data to achieve the desired business objections. For example, the conventional solution may involve 1) the application opening a file and the original file being copied locally to restore it in case of a policy violation; 2) the application closing the file and the modified file being copied locally to perform detection on the file; and 3) in case of policy violation, the original file being copied back to user location. The following embodiments describe proposed methods and systems for optimized DLP through NTFS removable media and through non-NTFS removable media. The embodiments described herein can prevent loss of confidential data through removable media, such as hot plug devices (e.g., USB devices), network shares, RDP volumes. Alternatively, other types of removable media may be used as would be appreciated by one of ordinary skill in the art having the benefit of this disclosure. The methods are more efficient than previous solutions. In some embodiments, if the removable media is NTFS, no additional copy of a file is created. In the case of a policy violation, the remote transaction is aborted and data in the file is restored to the previous state. While in other solutions, the driver had to create a backup copy and in the case of a policy violation had to restore the backup. The embodiments described herein uses file system transactions to avoid backup and restore of the file. In the case of a policy violation, the user's original data is restored, and it is not possible to recover deleted data through "undelete" software.

In the following description, numerous details are set forth. It will be apparent, however, to one of ordinary skill in the art having the benefit of this disclosure, that embodiments of the present invention may be practiced without these specific details.

Figure 1:
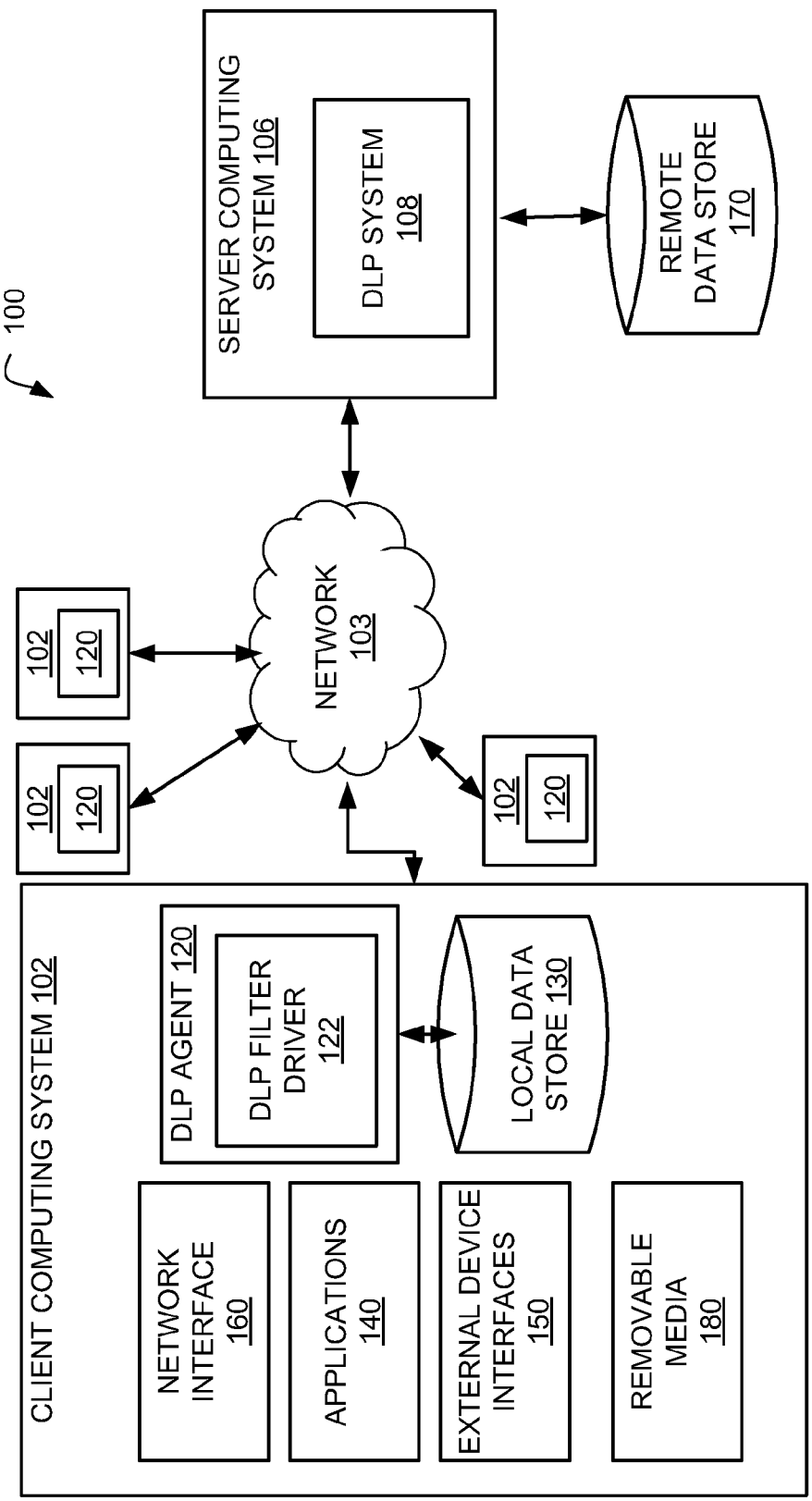
FIG. 1 is a block diagram of exemplary network architecture in which embodiments of a DLP filter driver may operate.

FIG. 1 is a block diagram of an exemplary network architecture 100 in which embodiments of a DLP filter driver may operate. The network architecture 100 may include multiple client computing systems 102 and a server computing system 106 coupled via a network 103 (e.g., public network such as the Internet or private network such as a local area network (LAN)). The client computing system 102 may include personal computers, laptops, PDAs, mobile phones, network appliances, etc. The server computing system 106 may be a network appliance, a gateway, a personal computer, etc. The client computing systems 102 and the server computing system 106 may reside on the same LAN, or on different LANs that may be coupled together via the Internet, but separated by firewalls, routers, and/or other network devices. The server computing system 106 may host a DLP system 108. In one embodiment, the server computing system 106 and the client computing systems 102 may be part of an organization, such as a corporate enterprise. Alternatively, the server computing system 106 and the client computing systems 102 may be part of different organizations.

The DLP system 108 may communicate with DLP agents 120. Although the embodiments may be used in a DLP system using DLP agents 120, the embodiments may also be used in other DLP products. Also, the embodiments described herein may be used in other applications that can be used for detecting violations of policies using the techniques as described herein as would be appreciated by one of ordinary skill in the art having the benefit of this disclosure.

The DLP agents 120 include a DLP filter driver 122, which is configured to detect when an application 140 opens and closes a file stored on a removable media 180 mounted on a file system of the computing system. When the application 140 opens the file, the DLP filter driver creates a transaction file object to allow detection of a violation of a DLP policy in data being written to the file stored on the removable media 180. When the application 140 closes the file, the DLP filter driver initiates a scan to detect a violation of the DLP policy in the data being written to the file stored in the removable media. The detection system can perform the scan (illustrated in FIGS. 2A-2C and 4A-4D). The detection system scans the data being written to the file that is part of the write transaction. The DLP filter driver 122 prevents a commit of a write transaction of the application to the file when a violation of the DLP policy is detected during the scan. Additional operations of the DLP agent 120 and the DLP filter driver 122 are described below with respect to FIGS. 2A-2C and 4A-4D.

The DLP system 108 may communicate with DLP agents 120 on the client computing systems 102 to perform operations to enforce a DLP policy as described herein. The DLP agent 120 is configured to detect a violation of a DLP policy. When a violation is detected, the DLP agent 120 may create an incident record of the violation, and may send the incident record to the DLP system 108, for example. The DLP system 108 is configured to receive the incident record of the violation from the DLP agent 120. In these embodiments, the DLP agent 120 creates the incident records. However, in other embodiments, any DLP product may be used to detect a violation and create an incident, and it is not limited to using DLP agents on an endpoint, as described herein. It should also be noted that other systems than DLP systems can use the DLP filter driver to permit transfers of different types of data to removable media 180.

In one embodiment, the DLP system 108 maintains a database to store the DLP policies, incident records, etc. In one embodiment, the database is implemented in a remote data store 170, which is communicatively coupled to the server computing system 106. In another embodiment, the remote data store 170 is local to the server computing system 106, but still remote to the client computing system 102. The DLP system 108 may also provide DLP services to computing systems within different networks and/or within different organizations, such a corporate enterprise.

Although only one server computing system 106 is illustrated in FIG. 1, the DLP system 108 may be hosed on one or more machines, including one or more server computers, client computers, gateways or other computing devices. In yet another configuration, the DLP service may reside on a single server, or on different servers, coupled to other devices via a public network (e.g., the Internet) or a private network (e.g., LAN). In another embodiment, a service provider hosts the DLP system 108. The hosted service provider may also have multiple instances of the DLP system 108 on multiple networks that communicate with the service provider over a public or private network. It should be noted that various other network configurations can be used including, for example, hosted configurations, distributed configurations, centralized configurations, etc, as would be appreciated by one of ordinary skill in the art having the benefit of this disclosure.

The depicted client computing system 102, which may operate as an endpoint machine in an enterprise network that uses the DLP system 108 to enforce one or more DLP policies, includes a DLP agent 120 that communicates with the DLP system 108. Embodiments of the DLP agent 120 are described below with respect to FIGS. 2A-2C and 4A-4D. The client computing system 102 may include applications 140, external device interfaces 150, and network interfaces 160 that can be monitored by the DLP agent 102 as would be appreciated by one of ordinary skill in the art having the benefit of this disclosure. In particular, the DLP filter driver 122 can filter for application read and write operations being performed on the removable media 180 to detect for violations of the DLP policy through the removable media 180 as described in more detail below. The client computing system 102 may also include a local data store 130, which can be one or more centralized data repositories that store the filter driver information, violation information, DLP policy information, and the like. The local data store 130 may represent a single or multiple data structures (databases, repositories, files, etc.) residing on one or more mass storage devices, such as magnetic or optical storage based disks, tapes or hard drives. Although illustrated as being local to the client computing system 102, the local data store 130 may be remote from the client computing system 102 and the client computing system 102 can communicate with the local data store 130 over a public or private network.

One of the proposed methods uses the latest NTFS transaction facility to avoid backup and restore when the removable media is NTFS removable media. When application opens a data file, DLP file system filter driver internally opens the same data file using file system transaction and is transparent to the application. All application read/writes are redirected to the remote transaction. When application tries to close the file, the DLP agent scans the file for detection and commits or aborts the remote transaction depending upon the policy as described in detail below with respect to FIGS. 2A-2C.

Figure 2A:
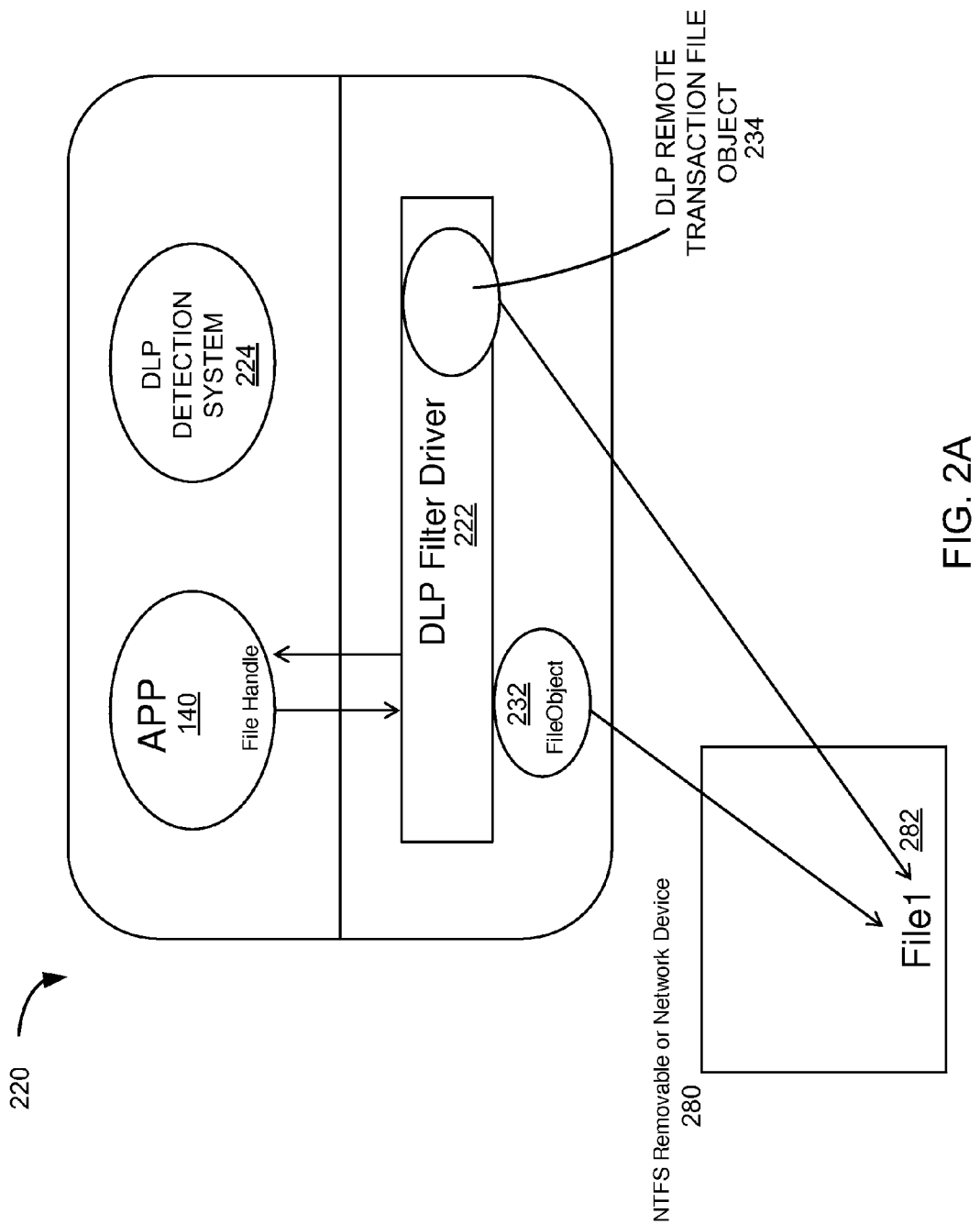
FIG. 2A-2C are block diagrams of one embodiments of a DLP agent, including a DLP filter driver and a DLP detection system to detect violations of a DLP policy by files stored on an NTFS removable media.
Figure 2B:
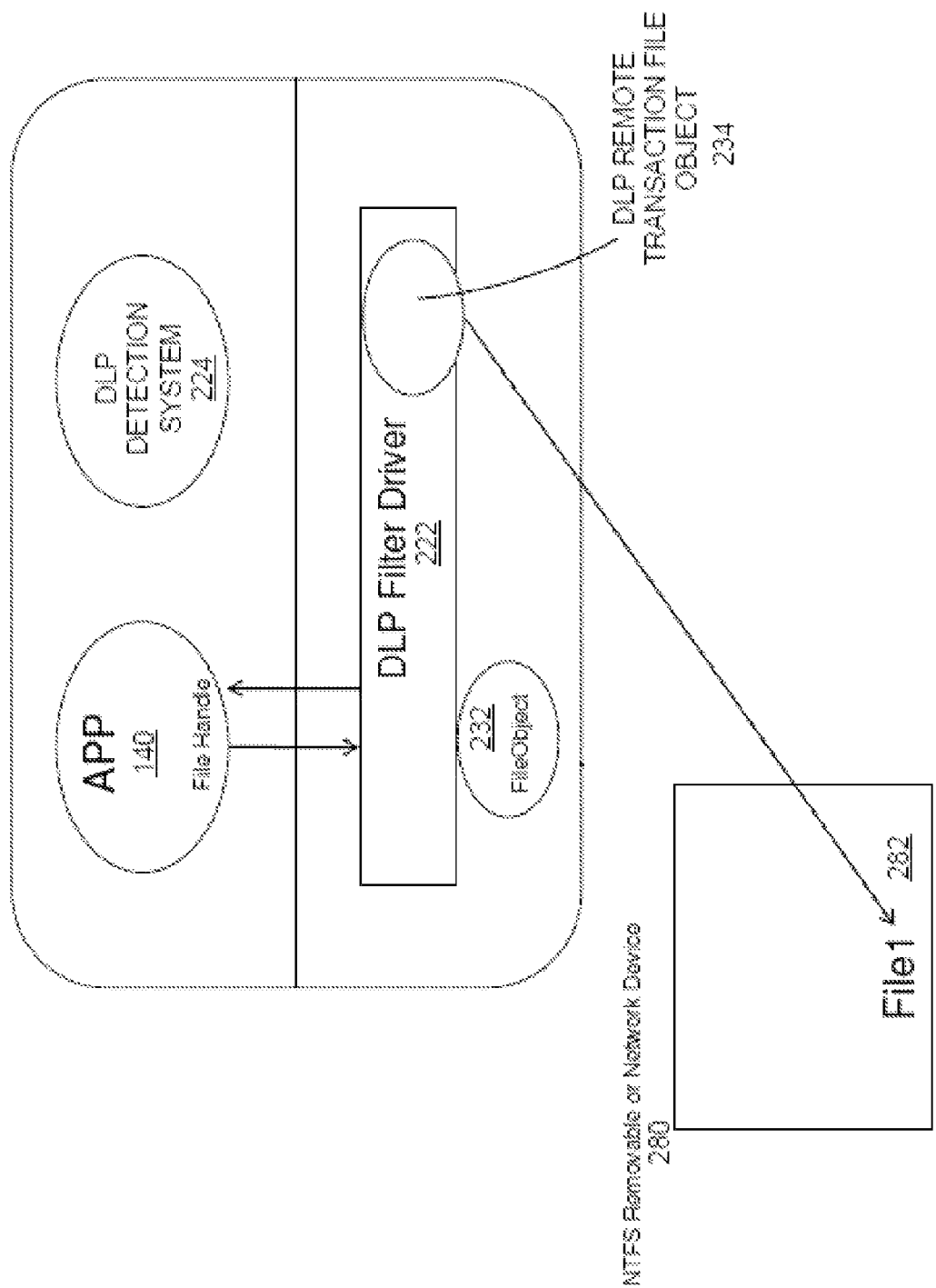
Figure 2C:
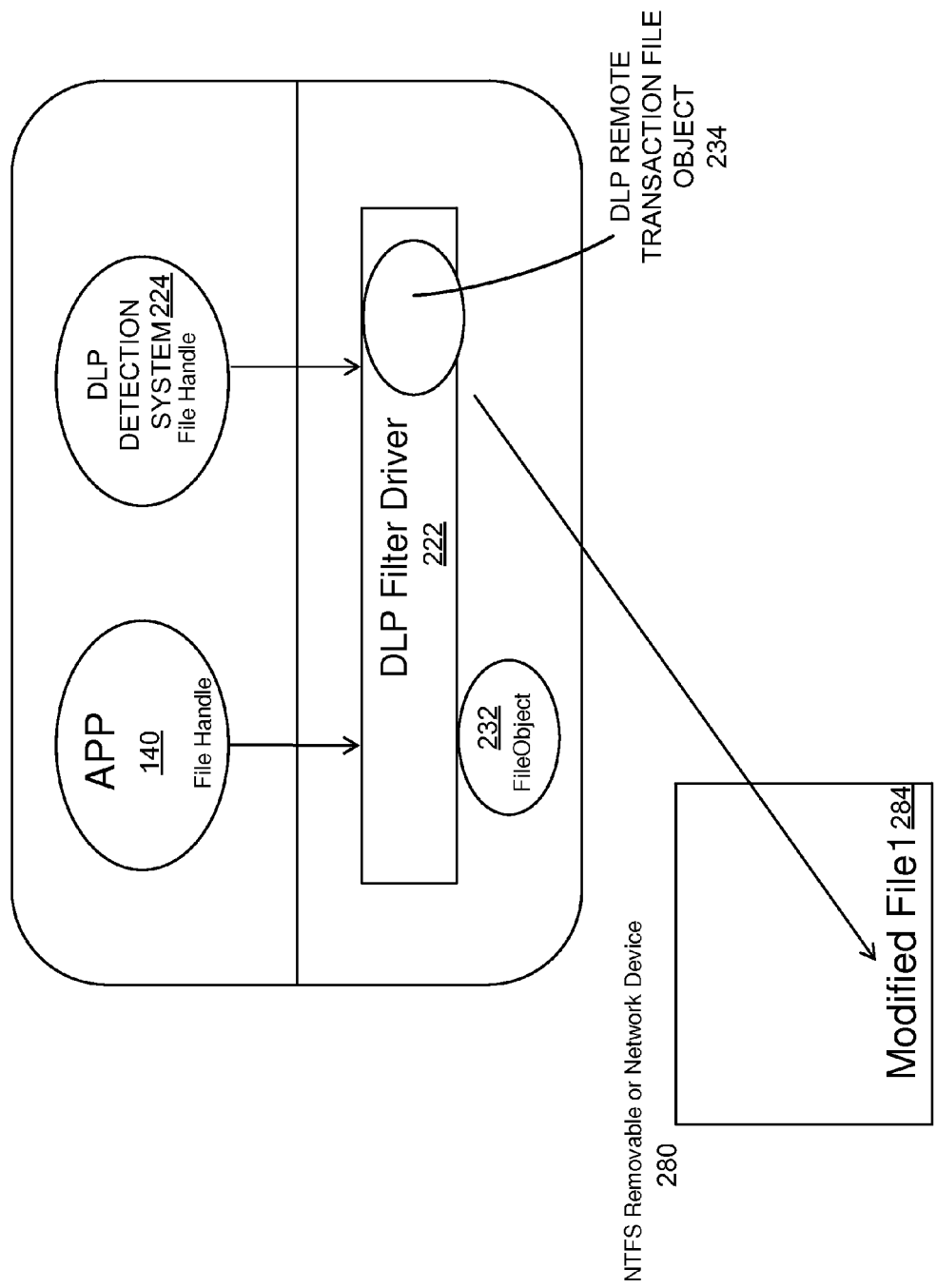

FIGS. 2A-2C are block diagrams of one embodiments of a DLP agent 220, including a DLP filter driver 222 and a DLP detection system 224 to detect violations of a DLP policy by files stored on an NTFS removable media 280. In the depicted embodiment, the DLP filter driver 222 monitors the application 140 to detect when the application 140 opens and closes a file 282 stored on the removable media 282 mounted on a file system of the computing system. The removable media 280 may be a removable storage media, a network share, or a volume, such as a RDP volume mounted on the file system. In these embodiments, the removable media 280 is NTFS removable media. Alternatively, the removable media 280 may be other types of file systems that are transaction aware file systems as described herein. When the application 140 requests to open the file 282, the DLP filter driver 222 opens the file 282 using a file object 232 and creates a transaction file object 234 (labeled as DLP remote transaction file object 234 in FIGS. 2A-2C). The transaction file object 234 opens the same file 282. The transaction file object 234 allows for the detection of a DLP policy in data being written to the file 282 stored on the removable media 280. When application 140 tries to close the file 282, the DLP filter driver 222 initiates a scan of the file by a detection system 224. The detection system 224 scans the file using transaction file object to detect a violation of the DLP policy in the data being written to the file 282 stored in the removable media 280. Based on the determination by the detection system 224, the DLP filter driver 222 commits or aborts the transaction(s). For example, when the detection system 224 detects a violation, the DLP filter driver 222 aborts transaction file object 234 and prevents data to be written to the file 282. If the detection system does not detect a violation, the DLP filter driver 222 commits transaction file object 234, allowing the data to be written to the file 282.

In another embodiment, as illustrated in FIG. 2A, the application 140 successfully opens a remote file 282 stored in NTFS removable media 280 (or network device). The DLP driver 222 creates a remote NTFS transaction file object 234 and opens the same file 282. In FIG. 2B, when application 140 performs a read operation or a write operation, the DLP driver 222 intercepts and performs the input/output (I/O) operation using the remote transaction file object 234. In FIG. 2C, the application 140 closes the file. The DLP driver 222 intercepts the close operation and invokes the DLP Detection System 224 to scan the modified file 284. The DLP filter driver 222 commits the remote transaction if the data of the remote transaction does not violate the DLP policy and aborts the remote transaction if the data violates the DLP policy.

In one embodiment, the detection system 224 is used to detect the DLP policies and may perform some remedial or notification operation to help enforce the DLP policies. For example, the detection system 224 can notify the DLP filter driver 222 that a violation has occurred so that the transaction file object 234 can be aborted. In some embodiments, when the detection system 224 considers the data transfer as insecure (e.g., detects a violation of the DLP policy), the detection system 224 can prevent the transaction as described above, and alert a user or an administrator. For example, the detection system 224 can generate an alert for a user or an administrator, or both. The alert may contain information about the violation.

In one embodiment, the DLP filter driver 222 of FIGS. 2A-2C is a mini filter driver in a kernel of an operating system of the client computing system 102. The filter driver 222 intercepts application file system calls. When an application 140 requests operations, such as an open file operation, read/write operations, and a close file operation, the filter driver 222 can perform different operations as described in more detail below.

In one embodiment, the filter driver 222 intercepts the request in the Pre-Create (e.g. IRP_MJ_CREATE) operation callback and the filter driver 222 determines whether the request is for a removable media/device 280. The filter driver 222 checks whether the file system of the removable media 280 is NTFS. The filter driver 222 applies user filters (e.g., file path, file type, file size) to determine whether the file needs to be monitored. If all the above conditions are satisfied, the filter driver 222 requests for a Post-Create (e.g. IRP_MJ_CREATE) operation callback. The filter driver 222 allows the operation to continue to allow the file to be opened. The filter driver 222 intercepts in the Post-Create callback and checks if the request to open the file was successful. The filter driver 222 creates a transaction file object and opens the same file synchronously using the created transaction file object. The transaction file object is a transaction aware file object. The new transaction aware file object will be saved in the stream handle context for the opened file object.

The filter driver 222 intercepts the Pre-Write (e.g. IRP_MJ_WRITE) operation (and other operations that modify the file or its metadata such as Pre-Read, Pre-SetInformation, Pre-SetEA for IRP_MJ_READ, IRP_MJ_SET_EA, IRP_MJ_SET_INFORMATION). The filter driver 222 checks if the file object has a stream handle context containing the transaction file object. If there is transaction aware file object, the operation is exclusively performed on this transaction file object; else it will allow the operation to continue on the original file object.

The filter driver 222 intercepts the Pre-Cleanup (e.g. IRP_MJ_CLEANUP) operation callback. The filter driver 222 checks if the file object has a stream handle context containing the transaction file object. If there is a transaction aware file object, the filter driver 222 may create the callers (client) security impersonation token and save the file name, its volume information, and file object in a global cache list along with the created security token. The filter driver 222 requests the DLP detection system 224 to perform DLP detection on the file. If the response is to allow the file, the filter driver 222 commits the transaction and closes the transaction file object. If the response is to block the file, the filter driver 222 aborts the transaction and closes the transaction file object. The filter driver 222 allows the operation to continue to allow the close of the original file object.

The filter driver 222 intercepts the Pre-Create (e.g. IRP_MJ_CREATE) operation callback from DLP detection system 224. The filter driver 222 checks if the request is being made by the user mode DLP agent and whether the file name is in the global cache list. Using the file details like name, volume the filter driver 222 retrieves the saved client security information and changes the requested input/output request packet (IRP) to contain the security token of the client. The filter driver 222 also retrieves the transacted file object, which will be passed to the Post-Create callback context. The filter driver 222 allows the operation to continue to allow the file to be opened.

The filter driver 222 intercepts in the Post-Create (e.g. IRP_MJ_CREATE) operation callback from the DLP detection system 224. The filter driver 222 checks if the request to open the file was successful, if request is being made by DLP detection system 224, the transaction file object passed in the callback context is saved in the stream handle context for the file object open by the agent. The file name and the associated data are removed from the global cache list.

This embodiment may optimize a DLP solution to prevent loss of protected data through NTFS removable media. The embodiment described above wraps normal I/O operations in NTFS transactions and avoids multiple copies of the file, as done conventionally. This embodiment addresses an important use case of preventing a malicious user trying to steal protected data (e.g., confidential data) in a consistent and secure manner by aborting the transaction if the data is protected as defined by the policy.

An alternate approach is to use the described invention logic, described above, in a user mode, by intercepting the CreateFile and CloseHandle APIs for each user application. However, one advantage of doing this in the filter driver 222 is that it is agnostic of any application and API.

In another embodiment, the DLP agent 220 includes other components, such as a classification engine, a violation reporter, a policy manager, and even a policy data store. The classification engine may be used to classify the data as would be appreciated by one of ordinary skill in the art having the benefit of this disclosure. In another embodiment, when the detection system 206 detects the violation, the violation reporter creates an incident record of the violation, and sends the incident record to the DLP system 108 and/or stores the incident record in the local data store 130. The violation reporter can send the incident records as they are generated or periodically. Similarly, the violation reporter can send multiple incident records to the DLP system 108 in batches or sequentially. If a violation is detection, the violation reporter may notify a system administrator (e.g., send an email or update a log file) about the policy violation incident, and may send information about the policy violation incident to the DLP service provider (e.g., DLP system 108). The information sent to the DLP service provider may identify, for example, the DLP policy being violated, the type of data being transferred, the destination entity specified to receive the data transfer, or other information concerning the violation, an identifier of the user or the client computing system 102 that caused the violation, as well as other information that may be helpful in remedying or recording the incidents. In another embodiment, the DLP system 108 is configured to receive the incident record of the violation from the violation reporter, and may be configured to perform some remedial or reporting operation as would be appreciated by one of ordinary skill in the art having the benefit of this disclosure.

The policy manager may be used to define DLP policies and store them in the policy data store. The policy may require monitoring for data transfers to removable media or network shares mounted on the file system of the computing system. The policy may also be used to monitor and detect for other types of DLP violations. For example, the policy may also specify sensitive data that should trigger a DLP policy if detected in the outbound data transfers. The policy manager may create DLP policies based on user input, such as from the user of the client computing system 102 or an administrator of an organization providing the client computing system 102. Alternatively, the policy manager may receive DLP policies from a DLP service provider (e.g., DLP system 108) and store them in the policy data store. The policy manager may also be configured to create DLP policies that specify criteria for detecting violations of the DLP policies.

It should be noted that the DLP system 120 may include other components for monitoring data transfers to the removable media 280 to detect violations of the DLP policy, as well as other types of policies. Details regarding these other components have not been included so as to not obscure the description of the present embodiments.

Figure 3A:
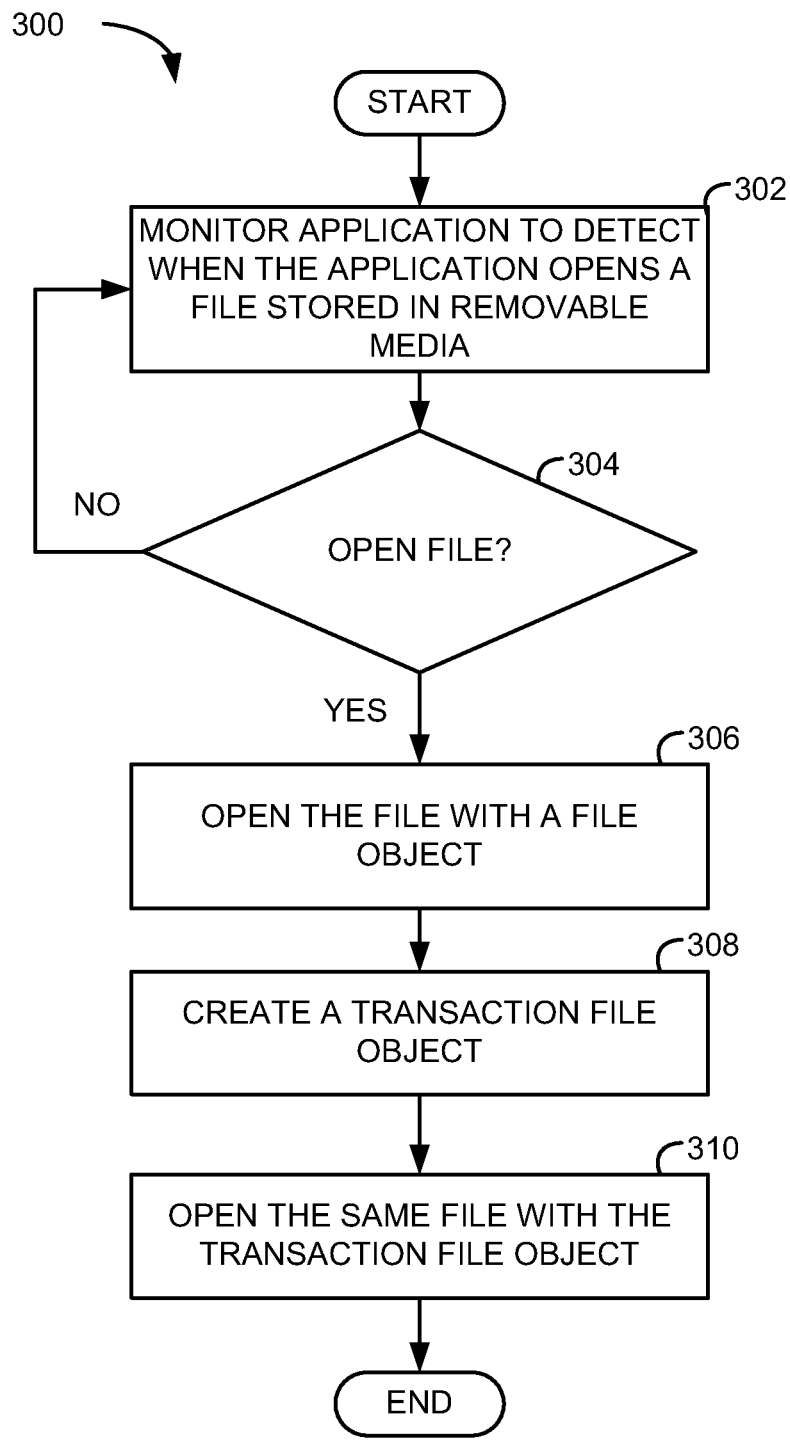
FIG. 3A is a flow diagram of one embodiment of a method of performing an open file operation of a file stored in a removable media.
Figure 3B:
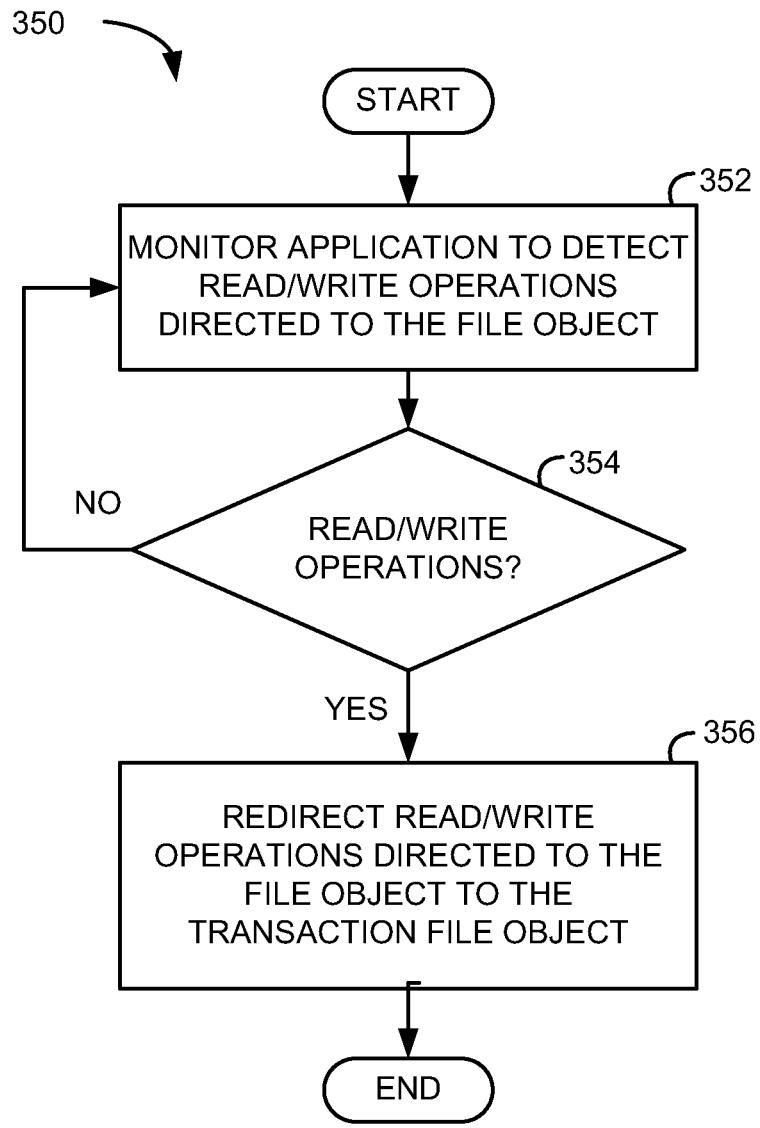
FIG. 3B is a flow diagram of one embodiment of a method of performing a read operation or a write operation on the file stored in the removable media.
Figure 3C:
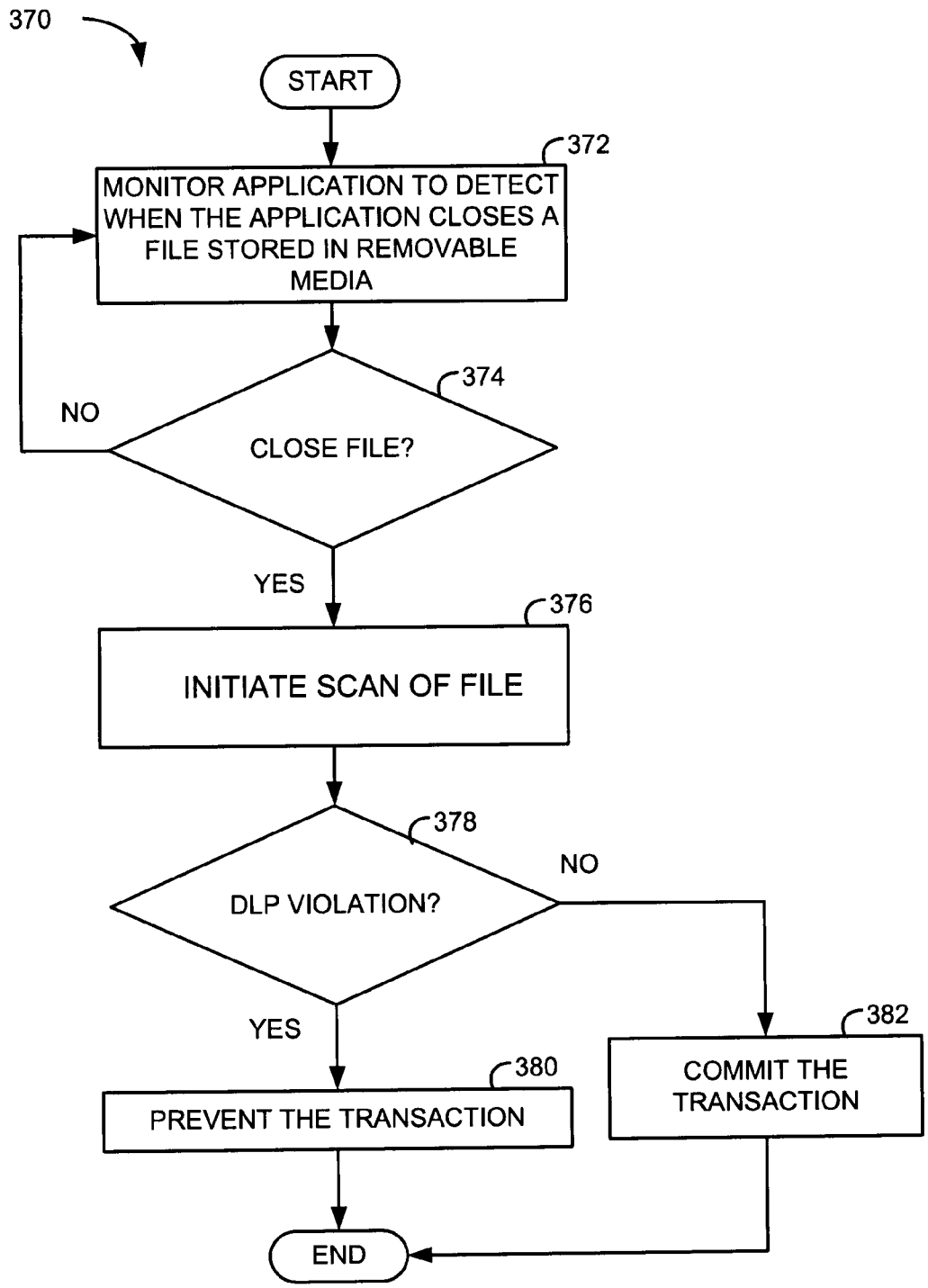
FIG. 3C is a flow diagram of one embodiment of a method of performing a close file operation of the file stored in the removable media.

FIGS. 3A-3C are flow diagrams of embodiments of a method 300 of performing an open file operation of a file stored in a removable media, a method 350 of performing a read operation or a write operation on the file stored in the removable media, and a method 370 of performing a close file operation of the file stored in the removable media. The methods 300, 350, and 370 are performed by processing logic that may comprise hardware (circuitry, dedicated logic, etc.), software (such as is run on a general purpose computing system or a dedicated machine), or a combination of both. In one embodiment, the client computing system 102 of FIG. 1 performs the methods 300, 350, and 370. In another embodiment, the DLP agent 120, 220 of FIGS. 1 and 2 performs the methods 300, 350, and 370. In another embodiment, the DLP filter driver 122, 222 of FIGS. 1 and 2 performs the methods 300, 350, and 370. Alternatively, other components of the client computing system 102 can be configured to perform some or all of the methods 300, 350, and 370.

Referring to FIG. 3A, processing logic begins method 300 by monitoring an application to detect when the application opens a file stored on a removable media mounted on a file system of the computing system (block 302). At block 304, if the processing logic detects the open file operation, the processing logic opens the file with a file object (block 306); otherwise, the processing logic returns to block 302 to continue monitoring. In addition to opening the file with the file object, the processing logic creates a transaction file object (block 308) and opens the same file with the transaction file object (block 310), and the method 300 ends.

Referring to FIG. 3B, processing logic begins method 350 by monitoring the application to detect read and write operations directed to the file object (block 352). At block 354, if the processing logic detects the read/write operation, the processing logic redirects the read/write operation directed to the file object to the transaction file object (block 356; otherwise, the processing logic returns to block 352 to continue monitoring.

Referring to FIG. 3C, processing logic begins method 370 by monitoring the application to detect when the application closes the file stored on the removable media mounted on a file system of the computing system (block 372). At block 374, if the processing logic detects the close file operation, the processing logic initiates a scan of the file(s) by the detection system (block 376). Next, processing logic determines if a violation of the DLP policy is detected during the scan (block 378). If the processing logic determines that the violation is detected, the processing logic prevents the transaction (block 380), and the method 370 ends. If the processing logic determines that a violation is not detected, the processing logic commits the transaction (block 382), and the method 370 ends.

FIG. 4A-4D are block diagrams of one embodiments of a DLP agent 420, including a DLP filter driver 422 and a DLP detection system 224 to detect violations of a DLP policy by files stored on a non-NTFS removable media 480. In the depicted embodiment, the DLP filter driver 422 monitors the application 140 to detect when the application 140 opens and closes a file 482 stored on the non-NTFS removable media 480 mounted on a file system of the computing system. The non-NTFS removable media 480 may be a removable storage media, a network share, or a volume, such as a RDP volume mounted on the file system. The non-NTFS removable media 480 is a non-NTFS based media that does not use the NTFS as the type of file system. Rather, the non-NTFS removable media 480 may be a File Allocation table (FAT) file system, a High Performance File System (HPFS) file system, or other types of file system as would be appreciated by one of ordinary skill in the art having the benefit of this disclosure.

When the application 140 opens the file 482, the DLP filter driver 422 opens the file 482 using a file object 432 and creates a transaction file object 434 (labeled as DLP local transaction file object 434 in FIGS. 4A-4D). Instead of opening the same file 482, the DLP filter driver opens a local copy 486 of the file 482 in a local NTFS medium 484 using transaction file object 434. The transaction file object 434 allows for the detection of a DLP policy in data being written to the file 482 stored on the non-NTFS removable media 480. The DLP filter driver 422 mirrors the application write operations on the file 482 in the local copy 486. In particular, the DLP filter driver 422 performs the write operation on the file object 432 and the transaction file object 434. However, the DLP filter driver 422 performs the write operation as a local transaction using the transaction file object. When application 140 tries to close the file 482, the DLP filter driver initiates a scan of the local copy 486 file by a detection system 224. The detection system 224 scans the file using transaction file object to detect a violation of the DLP policy in the data being written to the file 482 stored in the non-NTFS removable media 480. Based on the determination by the detection system 224, the transaction file object 434 commits or aborts the local transaction(s) depending upon the policy. For example, when the detection system 224 detects a violation, the DLP filter driver aborts transaction file object 434 and prevents the data being written to the local copy 486. Since the transaction(s) was aborted, the local copy 486 represents the file 482 before the modification. The DLP filter driver also overwrites the file 482 stored on the non-NTFS removable media 480 with the local copy that represents the file before the modification. If the detection system does not detect a violation, the DLP filter driver commits transaction file object 434, allowing the data to be written to the local copy 486. The DLP filter driver can keep the file 482 with the modifications.

Figure 4A:
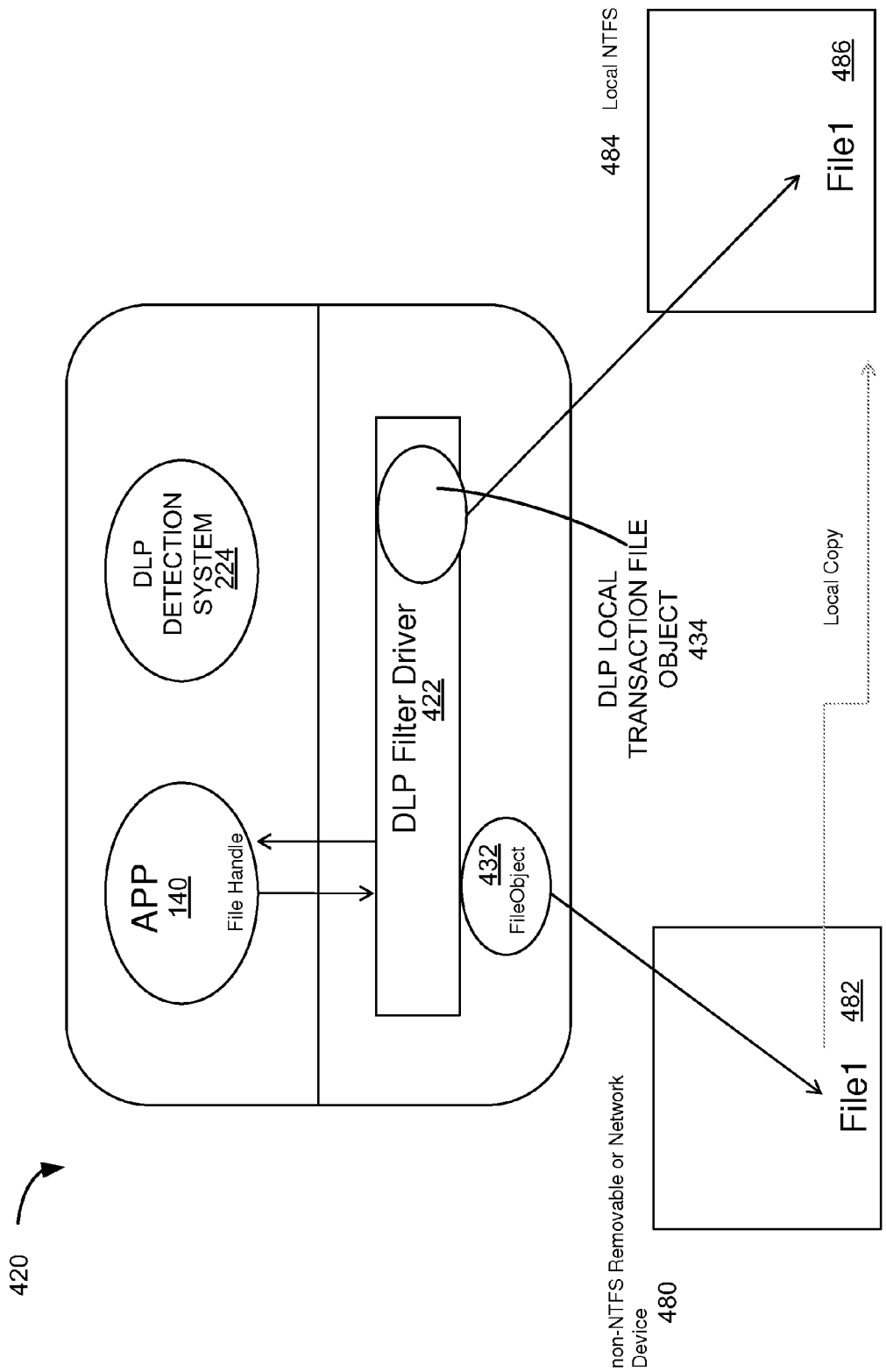
FIG. 4A-4D are block diagrams of one embodiments of a DLP agent, including a DLP filter driver and a DLP detection system to detect violations of a DLP policy by files stored on a non-NTFS removable media.
Figure 4B:
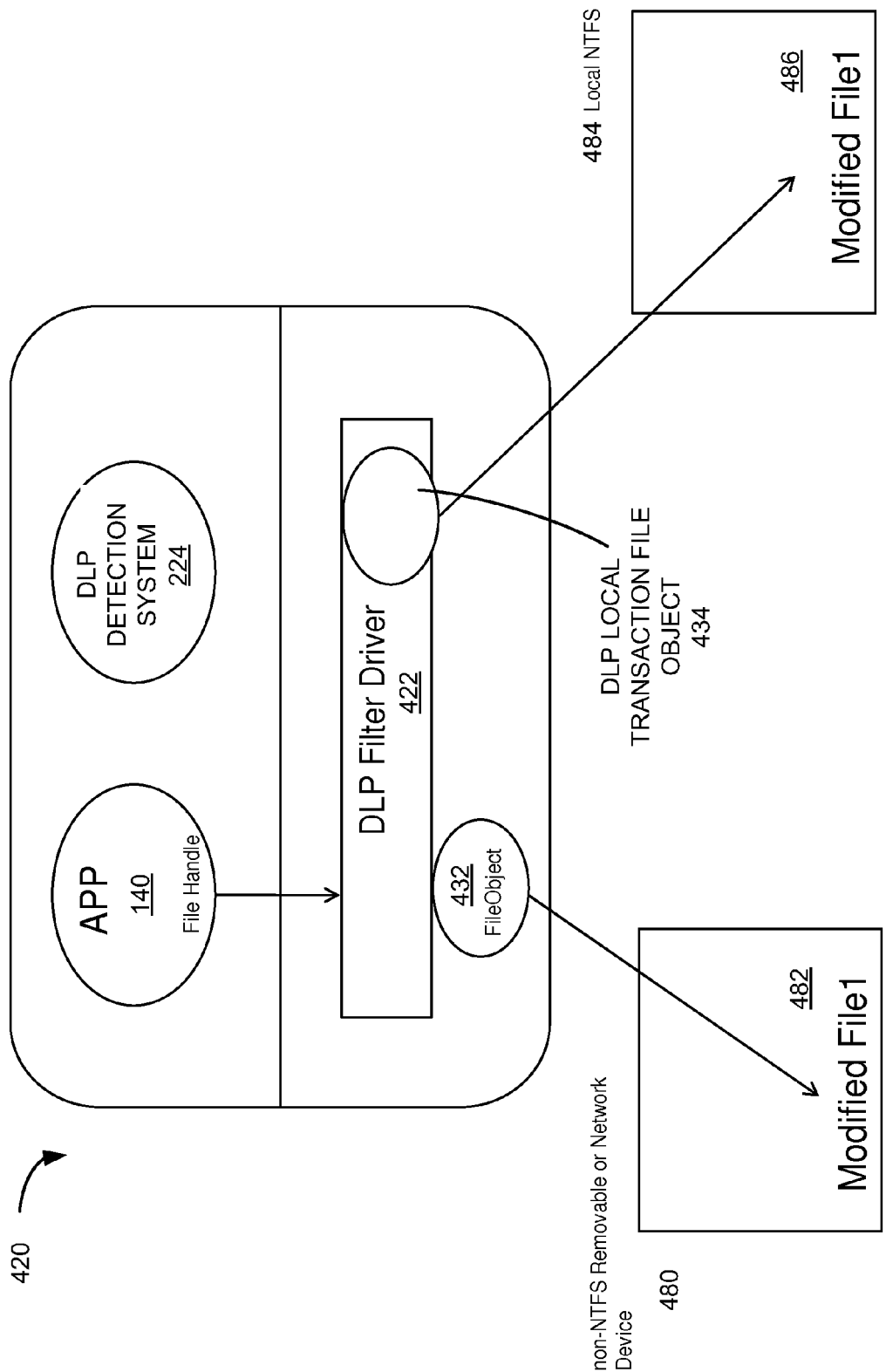
Figure 4C:
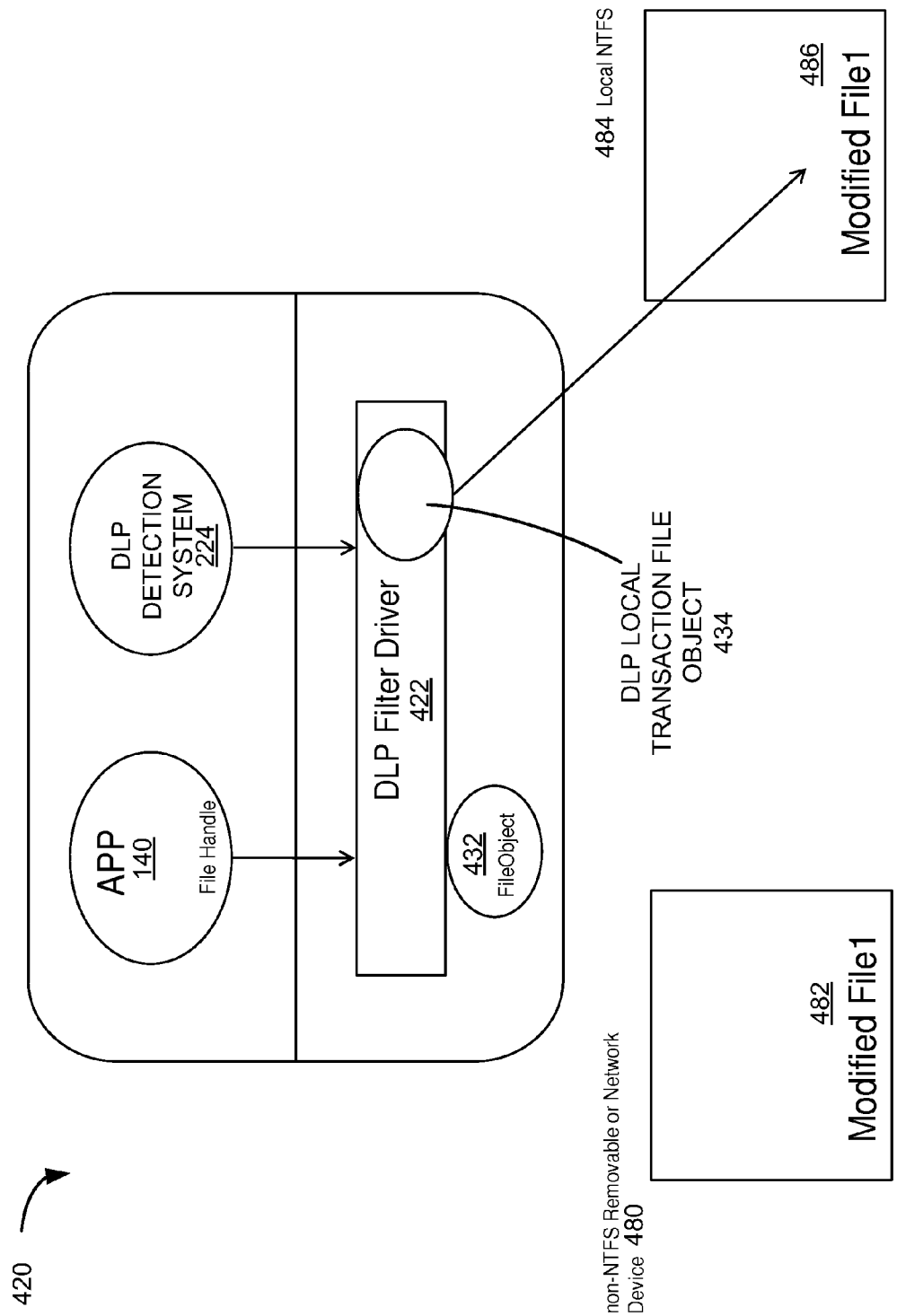
Figure 4D:
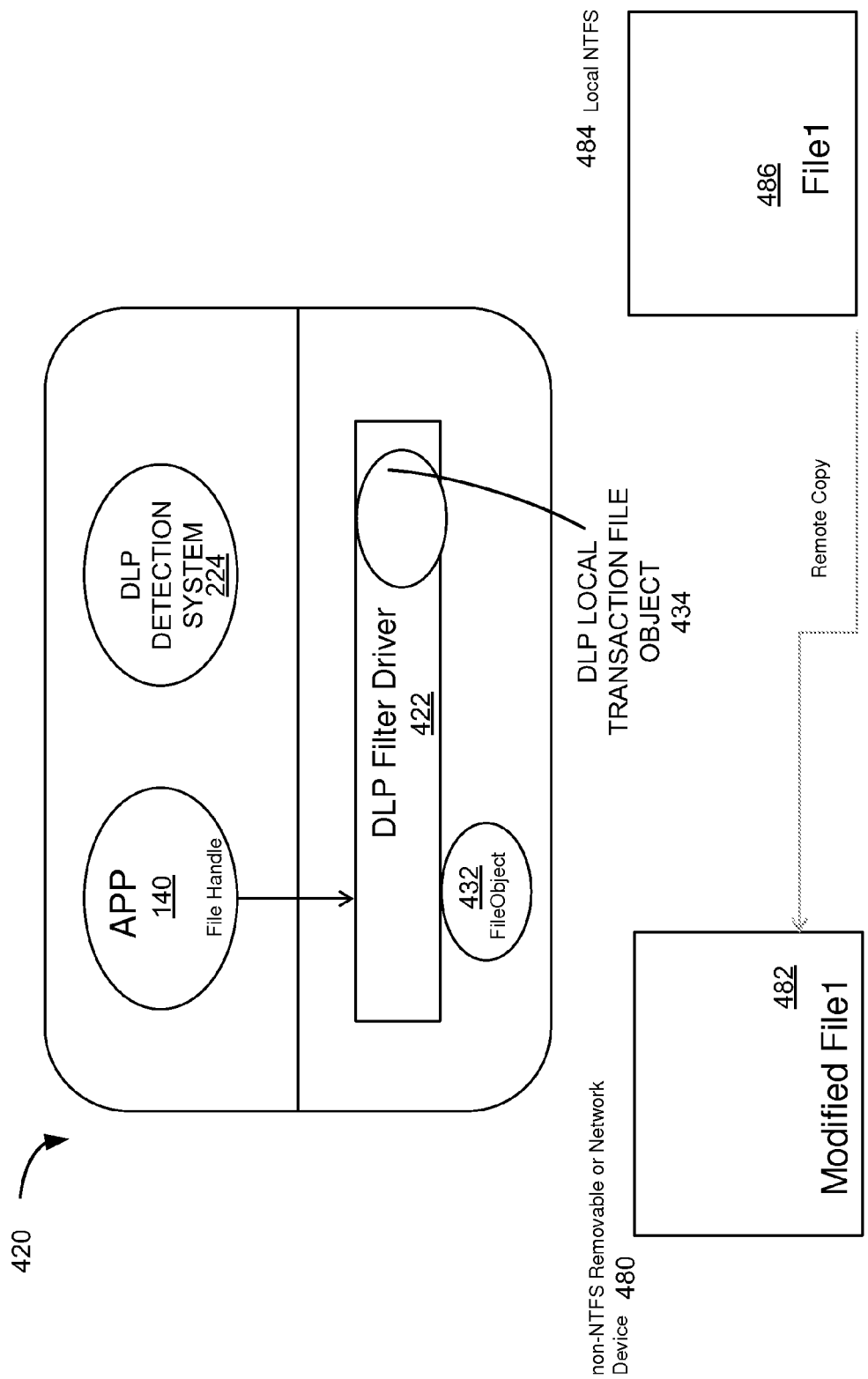

In FIG. 4B, when application 140 performs a write operation, the DLP driver 422 minors the operation, and performs the I/O operation using the file object 432 on the file 482 (modified file 1) and the performs the mirrored I/O operation using the transaction file object 434 on the local copy 486 (modified file 1). In FIG. 4C, the application 140 closes the file. The detection system 224 performs detection on the local transaction file object 434. The DLP filter driver commits the local transaction if the data of the remote transaction does not violate the DLP policy. In FIG. 4D, the application 140 closes the file, but the detection system 224 detects that the data of the local transaction does violate the DLP policy, and the DLP filter driver aborts the local transaction. When the local transaction is aborted the new local copy, which now contains the original data, is copied to the original remote location.

In one embodiment, the DLP filter driver 422 of FIGS. 4A-4D is a mini filter driver in a kernel of an operating system of the client computing system 102. The filter driver 422 intercepts application file system calls. When an application 140 requests operations, such as an open file operation, write operations, and a close file operation, the filter driver 422 can perform different operations as described in more detail below.

In one embodiment, the filter driver 422 intercepts Pre-Create (e.g. IRP_MJ_CREATE) operation callback. In the Pre-Create operation, the filter driver 422 determines whether the request is for a removable media/device. The filter driver 422 checks whether the file system is a non-NTFS. The filter driver 422 applies user filters (e.g., file path, file type, and file size) to determine whether the file needs to be monitored. If all the above conditions are satisfied, the filter driver 422 requests a PostCreate callback. The filter driver 422 allows the operation to continue to allow the file to be opened.

In Post-Create (e.g. IRP_MJ_CREATE) operation callback, the filter driver 422 checks if the request to open the file was successful. The filter driver 422 creates a temporary copy of the opened file on a NTFS formatted file system, for example, in a temporary folder under the DLP agent installed directory. The filter driver 422 creates a local transaction file object and opens the temporary file synchronously using the local transaction file object. The local transaction file object will be saved in the stream handle context for the opened file object.

In Pre-Write (e.g. IRP_MJ_WRITE) operation callback (and other operations that modify the file or its metadata such as Pre-SetInformation, PreSetEA for IRP_MJ_READ, IRP_MJ_SET_EA, IRP_MJ_SET_INFORMATION), the filter driver 422 checks if the file object has a stream handle context containing the local transaction file object. If there is local transaction file object, it will first be performed synchronously (or asynchronously) on this local transaction file object. The filter driver 422 allows the operation to continue on the original file.

In Pre-Cleanup (e.g. IRP_MJ_CLEANUP) operation callback, the filter driver 422 checks if the file object has a stream handle context containing the local transaction file object. If there is transaction aware file object, the filter driver 422 may create the callers (client) security impersonation token and save the file name, its volume information and file object in a global cache list along with the created security token. The filter driver 422 requests the DLP detection system 224 to perform detection on the local file. If the response is to allow the file, the filter driver 422 commits the transaction and closes the transaction file object. This committed transacted file may be used for subsequent writes on the file in case the user performs multiple save and write operations in a session. This optimizes the need to copy the original file multiple times. This local copy of the file will be deleted when the application closes. If the response is to block the file, the filter driver 422 aborts the transaction and closes the transaction file object. This would result in the local copy having the original file data. The filter driver 422 can copy the temporary file containing the original data to the original file location in the non-NTFS removable media. The filter driver 422 allows the operation to continue to allow the close of the original file object.

In Pre-Create (e.g. IRP_MJ_CREATE) operation callback from the DLP detection system 224, the filter driver 422 checks if the request is being made by the DLP detection system 224 and whether the file is in the global cache list. Using the file details like name, volume, the filter driver 422 retrieves the saved client security information and changes the requested input/output request packet (IRP) to contain the security token of the client. Also, the filter driver 422 can retrieve the transaction file object, which will be passed to the PostCreate callback context. The filter driver 422 allows the operation to continue to allow the file to be opened.

In Post-Create (e.g. IRP_MJ_CREATE) operation callback from the DLP detection system, the filter driver 422 checks if the request to open the file was successful, if request is being made by the DLP detection system 224, the filter driver 422 saves the transaction file object passed in the callback context in the stream handle context for the file object open by the DLP detection system 224. The file name and associated data may be removed from the global cache list.

Figure 5:
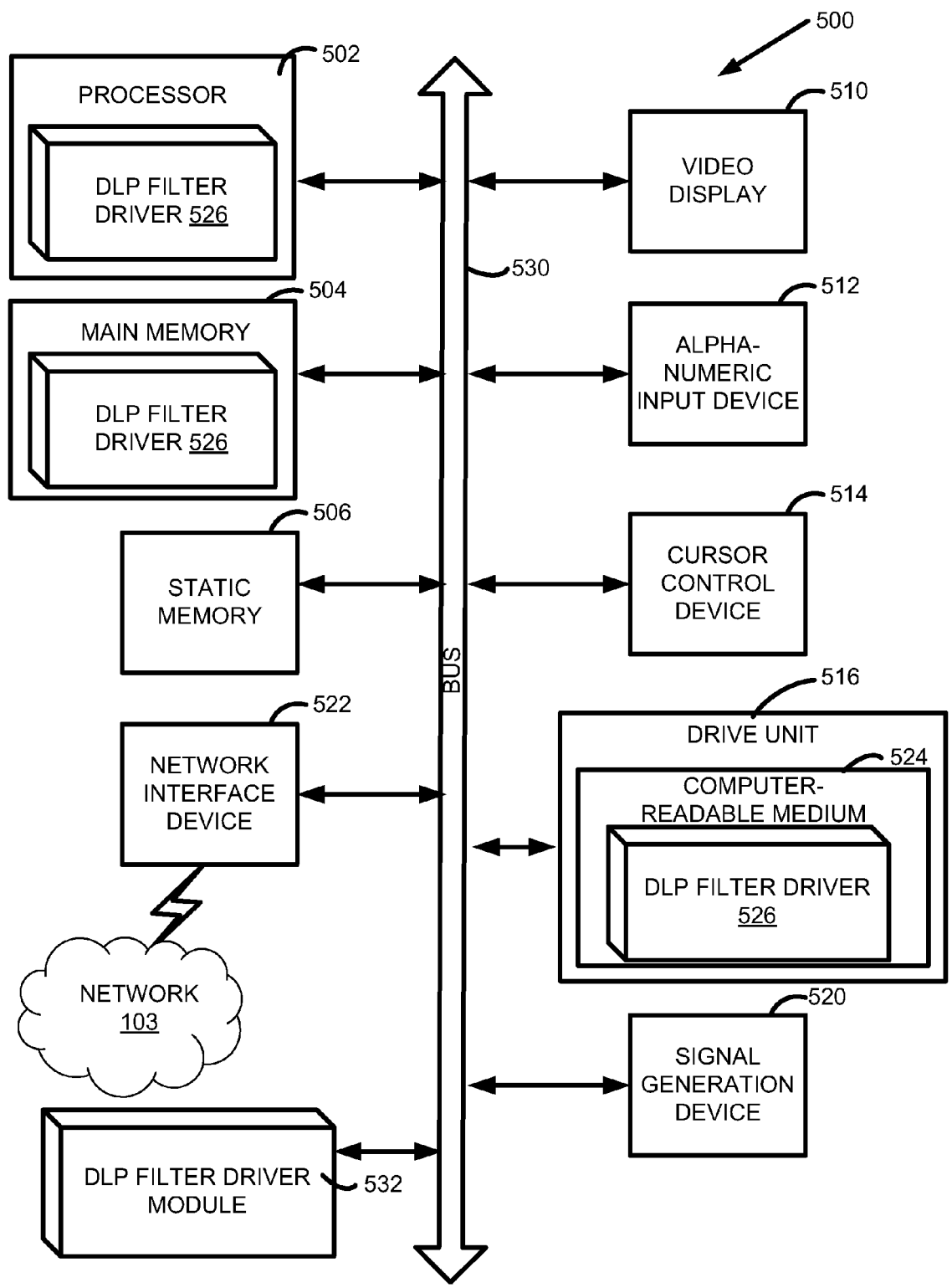
FIG. 5 illustrates a diagrammatic representation of a machine in the exemplary form of a computing system within which a set of instructions, for causing the machine to perform any one or more of the methodologies described herein, may be executed.

FIG. 5 illustrates a diagrammatic representation of a machine in the exemplary form of a computing system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as methods 300, 350, and 370 of FIG. 3A-3C.

The exemplary computing system 500 includes a processor 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 518, which communicate with each other via a bus 506.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic for DLP filter driver 526 for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions (e.g., DLP filter driver 526) embodying any one or more of the methodologies or functions described herein. The DLP filter driver 526 may also reside, completely or at least partially, within the main memory 504 and/or within the processor 502 during execution thereof by the computing system 500, the main memory 504, and the processor 502 also constituting computer-readable media. The DLP filter driver 526 may further be transmitted or received over a network 520 via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The DLP filter driver module 532, components, and other features described herein (for example in relation to FIGS. 1, 2A-2C, 3A-3C, and 4A-4D) can be implemented as discrete hardware components or integrated in the functionality of hardware components such as ASICS, FPGAs, DSPs, or similar devices. The DLP filter driver module 532 may implement operations of DLP filter driver 122 and 222, as described herein with respect to FIGS. 1, 2A-2C, and 3A-3C. Alternatively, the DLP filter driver module 532 may implement operations of the DLP filter driver 122 and 422, as described with respect to FIGS. 1 and 4A-4D. In addition, the DLP filter driver module 532 can be implemented as firmware or functional circuitry within hardware devices. Further, the DLP filter driver module 532 can be implemented in any combination hardware devices and software components.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "monitoring", "creating", "generating", "sending", "intercepting," "capturing," "mapping", "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computing system programmed to perform the following, comprising:
   detecting, by a data loss prevention (DLP) filter driver executing on the computing system, when an application opens and closes a file stored on a removable media mounted on a file system of the computing system;
   when the application opens the file,
      intercepting, by the DLP filter driver, a request to open a file for a read or write operation on the file,
      determining, by the DLP filter driver, that the file needs to be monitored for violations of a DLP policy,
      requesting, by the DLP filter driver, a callback from the application when the file needs to be monitored,
      opening, by a file object, the file in response to the request;
      intercepting, by the DLP filter driver, the callback to check if the request to open was successful,
      creating, by the DLP filter driver, a remote transaction object,
      concurrently opening, by the remote transaction object, a local copy of the same file as the file object, wherein the remote transaction object is a transaction aware file object that is transparent to a detection system to allow detection of a violation of a DLP policy in data being written to the file stored on the removable media;

when the application performs an operation on the file, mirroring, by the DLP filter driver, the operation directed to the file object to the remote transaction object;

when the application closes the file, initiating, by the DLP filter driver, a scan of the local copy to detect a violation of the DLP policy in the data being written to the file stored in the removable media; aborting a local transaction when a violation of the DLP policy is detected during the scan to prevent the data to be written to the local copy; and committing the remote transaction object to be written to the file stored in the removable media when no violation of the DLP policy is detected during the scan to allow the data to be written to the file stored on the removable media.

2. The method of claim 1, wherein the removable media is New Technology File System (NTFS) removable media.

3. The method of claim 2, wherein the remote transaction file object is an NTFS transaction file object.

4. The method of claim 2, further comprising:
detecting, by the DLP filter driver, read operations and write operations originally directed to the file object;
redirecting the read operations and the write operations to the remote transaction file object; and
performing the read operations and the write operations as NTFS transactions using the remote transaction file object.

5. The method of claim 4, wherein said performing one of the write operations comprises creating a NTFS transaction to modify the local copy of the file by the remote transaction file object, wherein the NTFS transaction to modify the local copy of the file is committed to overwrite the file stored on the NTFS removable media when the violation of the DLP policy is not detected during the scan and the NTFS transaction to modify the file is aborted when the violation of the DLP policy is detected during the scan.

6. The method of claim 1, wherein the removable media does not support transactions, and wherein the method further comprises:
opening the file using the file object when the application opens the file; and
creating the local copy of the file.

7. The method of claim 6, further comprising:
detecting, by the DLP filter driver, write operations originally directed to the file object;
mirroring the write operations to the file object and to the remote transaction file object;
performing the write operations on the file using the file object; and
performing the write operations on the local copy of the file as local transactions using the remote transaction file object.

8. The method of claim 7, wherein said performing one of the write operations comprises:
creating the local transaction to modify the local copy of the file by the remote transaction file object; and
aborting the local transaction and copying the local copy to overwrite the file stored on the removable media when the violation of the DLP policy is detected during the scan, wherein the local copy represents the file before the modification.

9. The method of claim 6, wherein the remote transaction file object is an NTFS transaction file object, and wherein the removable media is non-NTFS removable media.

10. The method of claim 1, wherein the removable media is at least one of a removable storage medium, a network share, or a remote desktop protocol (RDP) volume.

11. A computing system, comprising:
a memory; and
a processor coupled with the memory to
detect, by a data loss prevention (DLP) filter driver executing on the computing system, when an application opens and closes a file stored on a removable media mounted on a file system of the computing system;
when the application opens the file,
intercept, by the DLP filter driver, a request to open a file for a read or write operation on the file,
determine, by the DLP filter driver, that the file needs to be monitored for violations of a DLP policy,
request, by the DLP filter driver, a callback from the application when the file needs to be monitored,
open, by a file object, the file in response to the request;
intercept, by the DLP filter driver, the callback to check if the request to open was successful,
create a remote transaction object,
concurrently open, by the remote transaction object, a local copy of the same file as the file object, wherein the remote transaction object is a transaction aware file object that is transparent to a detection system to allow detection of a violation of a DLP policy in data being written to the file stored on the removable media;
when the application performs an operation on the file,
mirror, by the DLP filter driver, the operation directed to the file object to the remote transaction object;
when the application closes the file, initiate, by the DLP filter driver, a scan of the local copy to detect a violation of the DLP policy in the data being written to the file stored in the removable media; abort a local transaction when a violation of the DLP policy is detected during the scan to prevent the data to be written to the local copy; and commit the remote transaction to be written to the file stored in the removable media when no violation of the DLP policy is detected during the scan to allow the data to be written to the file stored on the removable media.

12. The computing system of claim 11, wherein the removable media is New Technology File System (NTFS) removable media.

13. The computing system of claim 12, wherein the remote transaction file object is an NTFS remote transaction file object.

14. The computing system of claim 11, wherein the removable media does not support transactions, and wherein the processor is further to:
open the file using the file object when the application opens the file;
create the local copy of the file;
detect, by the DLP filter driver, write operations originally directed to the file object;
minor the write operations to the file object and to the remote transaction file object;
perform the write operations on the file using the file object; and
perform the write operations on the local copy of the file as local transactions using the remote transaction file object.

15. The computing system of claim 14, wherein the processor is further to:
- create the local transaction to modify the local copy of the file by the remote transaction file object; and
- abort the local transaction and copy the local copy to overwrite the file stored on the removable media when the violation of the DLP policy is detected during the scan, wherein the local copy represents the file before the modification.

16. A non-transitory computer readable storage medium including instructions that, when executed by a processor, cause the processor to perform operations comprising:
- detecting, by a data loss prevention (DLP) filter driver executing on the computing system, when an application opens and closes a file stored on a removable media mounted on a file system of the computing system;
- when the application opens the file,
  - intercepting, by the DLP filter driver, a request to open a file for a read or write operation on the file,
  - determining, by the DLP filter driver, that the file needs to be monitored for violations of a DLP policy,
  - requesting, by the DLP filter driver, a callback from the application when the file needs to be monitored,
  - opening, by a file object, the file in response to the request;
  - intercepting, by the DLP filter driver, the callback to check if the request to open was successful,
  - creating, by the DLP filter driver, a remote transaction object,
  - concurrently opening, by the remote transaction object, a local copy of the same file as the file object, wherein the remote transaction object is a transaction aware file object that is transparent to a detection system to allow detection of a violation of a DLP policy in data being written to the file stored on the removable media;
- when the application performs an operation on the file,
  - mirroring, by the DLP filter driver, the operation directed to the file object to the remote transaction object;
- when the application closes the file, initiating, by the DLP filter driver, a scan of the local copy to detect a violation of the DLP policy in the data being written to the file stored in the removable media; aborting a local transaction when a violation of the DLP policy is detected during the scan to prevent the data to be written to the local copy; and
- committing the remote transaction object to be written to the file stored in the removable media when no violation of the DLP policy is detected during the scan to allow the data to be written to the file stored on the removable media.

17. The non-transitory computer readable storage medium of claim 16, wherein the removable media is New Technology File System (NTFS) removable media.

18. The non-transitory computer readable storage medium of claim 16, wherein the removable media does not support transactions, and wherein the operations further comprises:
- opening the file using the file object when the application opens the file; and
- creating a local copy of the file.

* * * * *